US012664312B1

(12) United States Patent
Han et al.

(10) Patent No.: US 12,664,312 B1
(45) Date of Patent: Jun. 23, 2026

(54) ANONYMIZATION FOR LOG FILE ACCESS CONTROL

(71) Applicant: Zoom Video Communications, Inc., San Jose, CA (US)

(72) Inventors: Jianbing Han, Los Gatos, CA (US); Fei Hu, Hefei (CN); Nuowen Jian, San Jose, CA (US); Dan Liu, Hefei (CN); Tengteng She, Hefei (CN); Chao Wang, Hefei (CN); Li Wang, Hefei (CN); Hanqing Zhao, Hefei (CN)

(73) Assignee: Zoom Communications, Inc., San Jose, CA (US)

( * ) Notice: Subject to any disclaimer, the term of this patent is extended or adjusted under 35 U.S.C. 154(b) by 76 days.

(21) Appl. No.: 18/940,057

(22) Filed: Nov. 7, 2024

(51) Int. Cl.
 *G06F 21/00* (2013.01)
 *G06F 21/62* (2013.01)

(52) U.S. Cl.
 CPC .. *G06F 21/6254* (2013.01); *G06F 2221/2141* (2013.01)

(58) Field of Classification Search
 CPC ..................... G06F 21/6254; G06F 2221/2141
 See application file for complete search history.

(56) References Cited

U.S. PATENT DOCUMENTS

| | | | | |
|---|---|---|---|---|
| 2013/0272523 | A1* | 10/2013 | McCorkindale | ......... H04N 1/44 |
| | | | | 380/243 |
| 2016/0132694 | A1* | 5/2016 | Dhoolia | ............... G06F 21/602 |
| | | | | 713/165 |
| 2019/0312881 | A1* | 10/2019 | Dasgupta | .............. H04L 63/104 |
| 2022/0318404 | A1* | 10/2022 | Wong | .................... G06F 21/602 |
| 2022/0377059 | A1 | 11/2022 | Lyons et al. | |
| 2023/0134781 | A1* | 5/2023 | Senerth | ............... G06F 21/6227 |
| | | | | 726/26 |
| 2023/0185934 | A1* | 6/2023 | Seilnacht | .............. G06F 21/602 |
| | | | | 726/27 |

* cited by examiner

*Primary Examiner* — William A Corum, Jr.
(74) *Attorney, Agent, or Firm* — Kilpatrick Townsend & Stockton, LLP

(57) ABSTRACT

Aspects and features provide system that accesses an activity log for a telecommunication system and detects, at the code level, sensitive information occurrences within the activity log. The system can anonymize the sensitive information occurrences, for example, using encryption. The system can generate different versions of the activity log including the sensitive information occurrences anonymized using encryption or removed. The system stores the activity logs in a log query database, or otherwise in some manner so that the system can receive log queries and display or print logs or portions of the logs needed to conduct troubleshooting, but with sensitive information occurrences obscured or removed. Different levels of access can be provided using role-based access control.

17 Claims, 9 Drawing Sheets

700

RECEIVE AN ACCESS REQUEST FOR THE PRIVATE VERSION OF AN ACTIVITY LOG — 702

RECEIVE A CLUSTER KEY CORRESPONDING TO A GEOGRAPHIC AREA AND AN EPHEMERAL KEY CORRESPONDING TO THE ACCESS REQUEST — 704

DETERMINE A ROLE ASSOCIATED WITH THE ACCESS REQUEST — 706

GRANT ACCESS TO THE PRIVATE ACTIVITY LOG IN RESPONSE TO THE LOG QUERY BASED ON THE ROLE, THE CLUSTER KEY, AND THE EPHEMERAL KEY — 708

LOGGING SUBSYSTEM DECRYPTS THE SENSITIVE INFORMATION OCCURRENCE(S) — 710

DISPLAY THE PRIVATE ACTIVITY LOG — 712

SYSTEM
200

CLIENT DEVICE
220

REAL-TIME
MEDIA
212

NETWORK
SERVICES
214

VIDEO ROOM
GATEWAY
216

TELEPHONY
GATEWAY
218

VIDEO CONFERENCE PROVIDER
210

CLIENT DEVICE
230

CLIENT DEVICE
240

USER IDENTITY
PROVIDER
215

CLIENT DEVICE
250

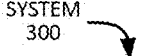
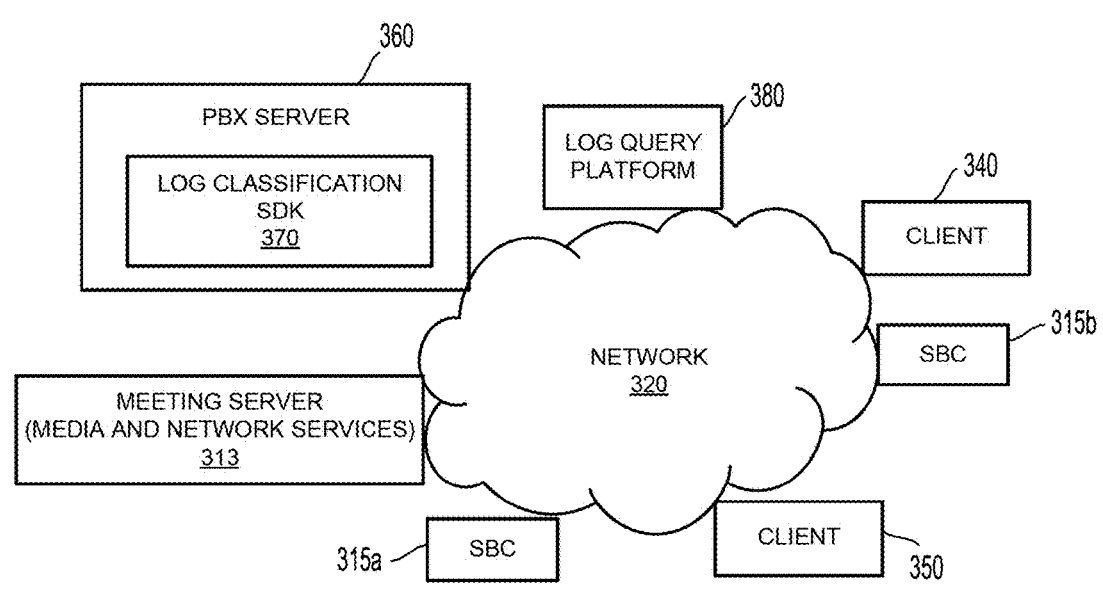
*FIG. 3*

400

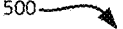
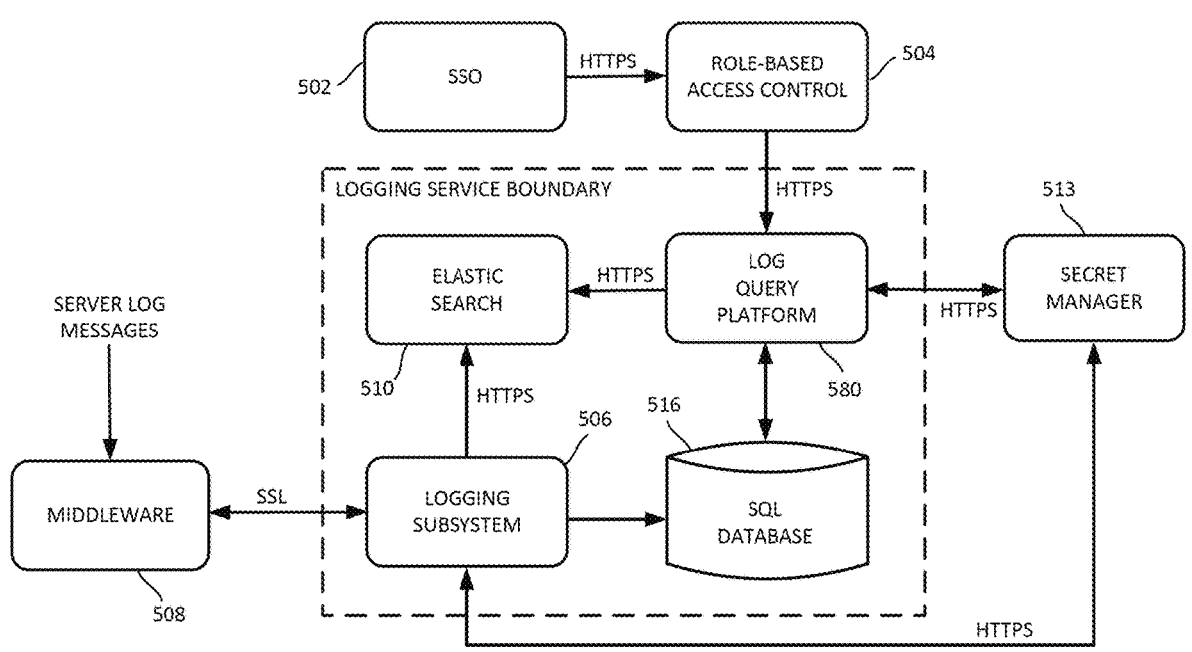
*FIG. 5*

600

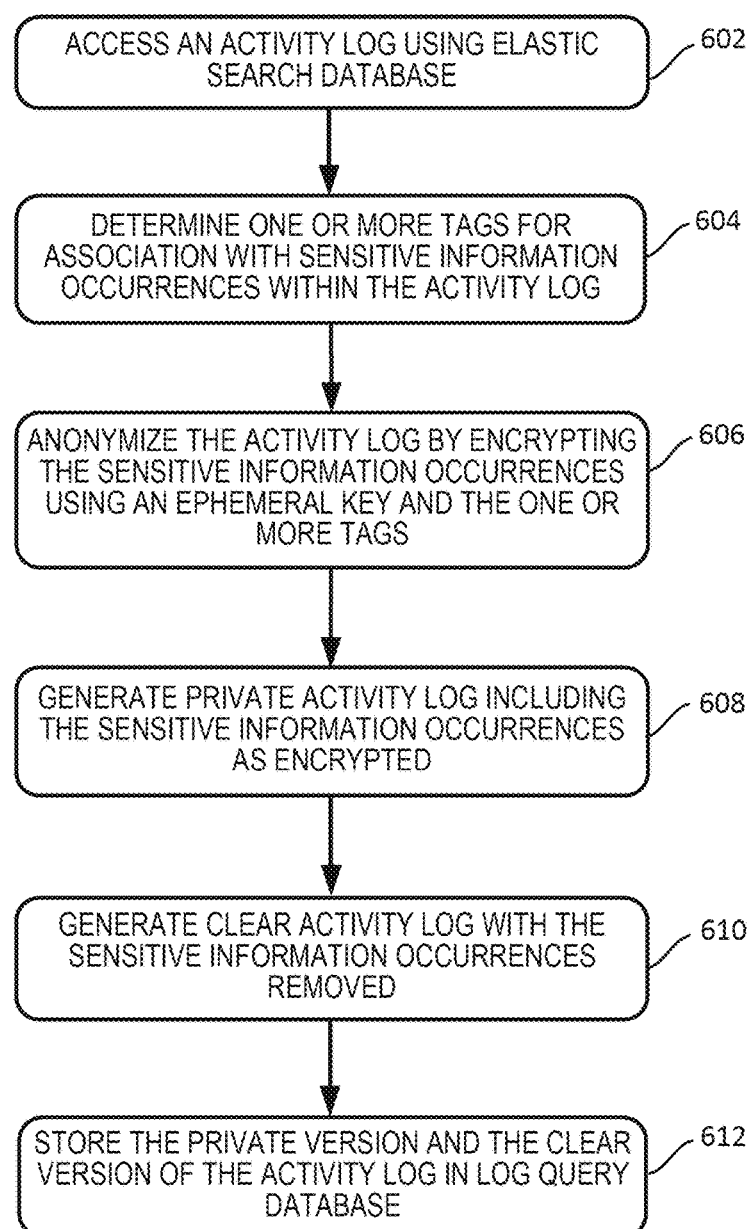

ACCESS AN ACTIVITY LOG USING ELASTIC SEARCH DATABASE — 602

DETERMINE ONE OR MORE TAGS FOR ASSOCIATION WITH SENSITIVE INFORMATION OCCURRENCES WITHIN THE ACTIVITY LOG — 604

ANONYMIZE THE ACTIVITY LOG BY ENCRYPTING THE SENSITIVE INFORMATION OCCURRENCES USING AN EPHEMERAL KEY AND THE ONE OR MORE TAGS — 606

GENERATE PRIVATE ACTIVITY LOG INCLUDING THE SENSITIVE INFORMATION OCCURRENCES AS ENCRYPTED — 608

GENERATE CLEAR ACTIVITY LOG WITH THE SENSITIVE INFORMATION OCCURRENCES REMOVED — 610

STORE THE PRIVATE VERSION AND THE CLEAR VERSION OF THE ACTIVITY LOG IN LOG QUERY DATABASE — 612

FIG. 6

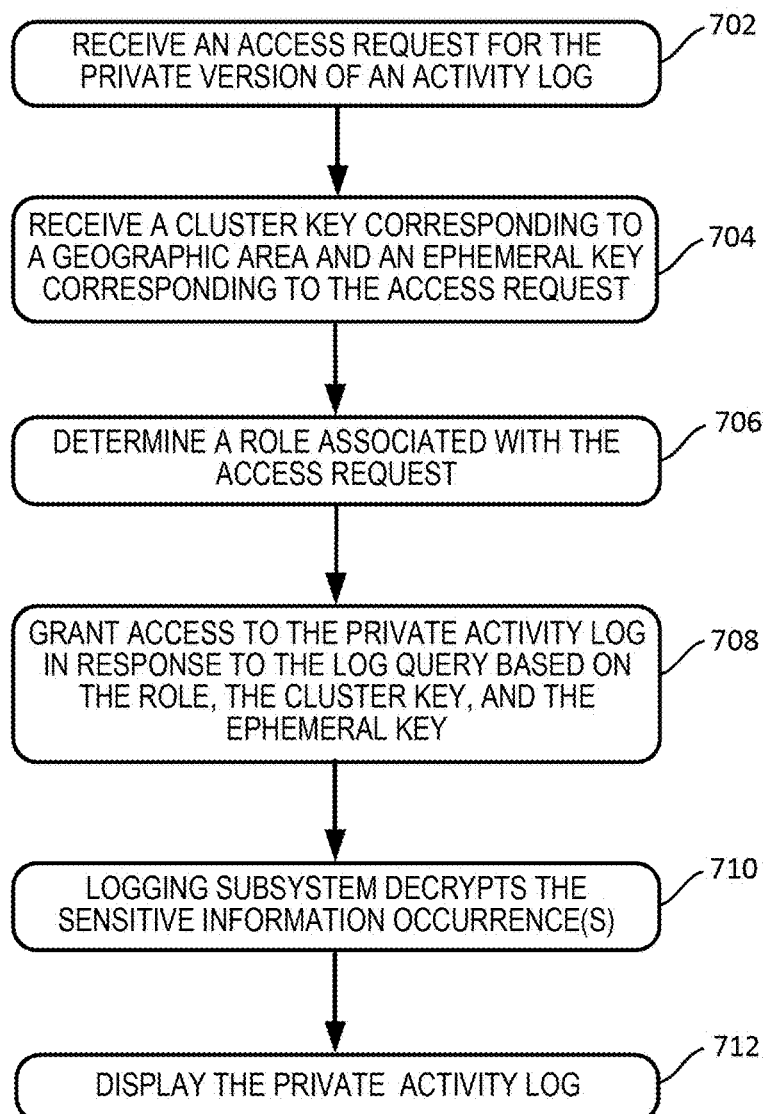

700

702
RECEIVE AN ACCESS REQUEST FOR THE PRIVATE VERSION OF AN ACTIVITY LOG

704
RECEIVE A CLUSTER KEY CORRESPONDING TO A GEOGRAPHIC AREA AND AN EPHEMERAL KEY CORRESPONDING TO THE ACCESS REQUEST

706
DETERMINE A ROLE ASSOCIATED WITH THE ACCESS REQUEST

708
GRANT ACCESS TO THE PRIVATE ACTIVITY LOG IN RESPONSE TO THE LOG QUERY BASED ON THE ROLE, THE CLUSTER KEY, AND THE EPHEMERAL KEY

710
LOGGING SUBSYSTEM DECRYPTS THE SENSITIVE INFORMATION OCCURRENCE(S)

712
DISPLAY THE PRIVATE ACTIVITY LOG

*FIG. 7*

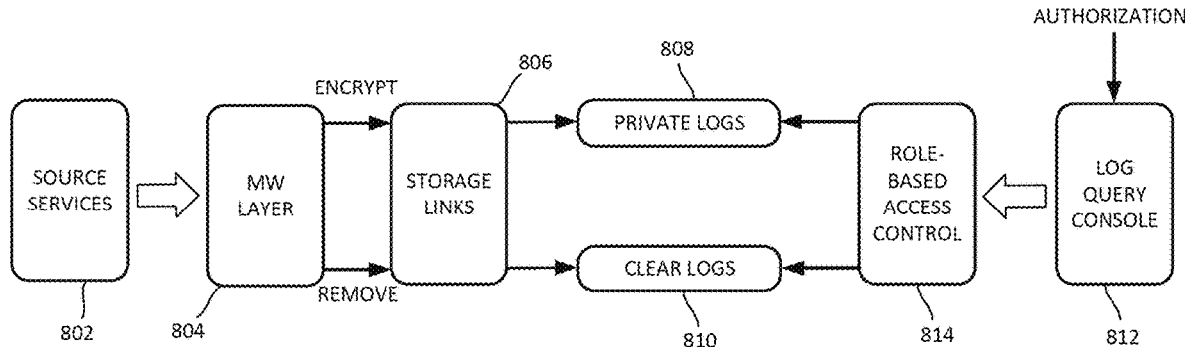
*FIG. 8*

ANONYMIZATION FOR LOG FILE ACCESS CONTROL

FIELD

The present application relates to activity logs for computer-based communication systems. More specifically, the present application relates to processing such logs to anonymize the logs with respect to sensitive information that may appear in the logs. Role-based access control can also be provided for the logs in order to accommodate differing levels of access for engineering and support personnel as needed for troubleshooting, while protecting sensitive user data.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIGS. 1 through 3 illustrate example systems to enable anonymization for log file access control.

FIG. 5 illustrates an example software architecture to enable anonymization for log file access control.

FIG. 6 illustrates an example method for providing anonymization for log file access control.

FIG. 7 illustrates an example method for providing access to activity logs that have been anonymized for log file access control.

FIG. 8 illustrates an example log query platform providing both high sensitivity and low sensitivity anonymized logs, as well as role-based access control for log file access.

DETAILED DESCRIPTION

Figure 1:
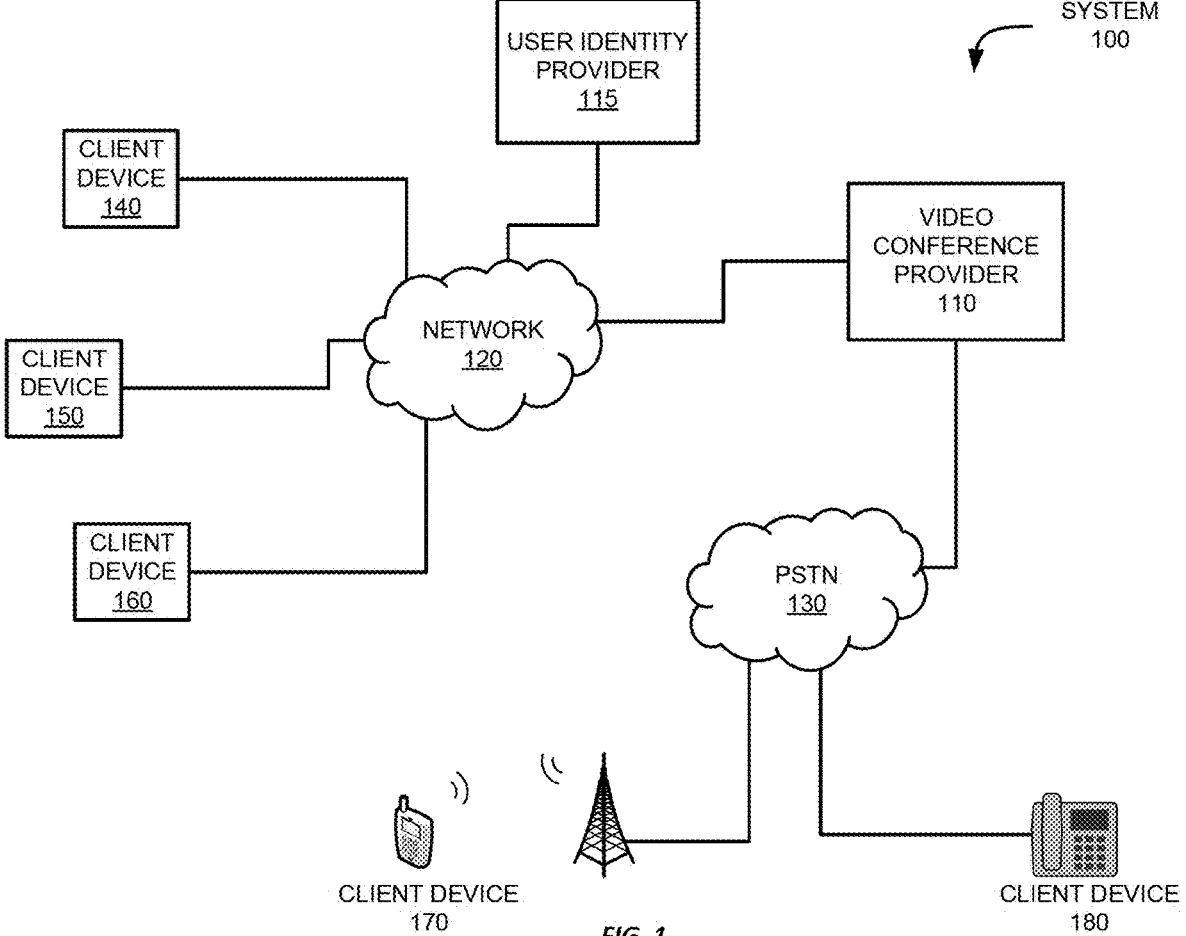

Examples are described herein in the context of systems and methods for providing anonymization for log file access control. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Virtual video conferencing, audio conferencing, chat, digital phone functionality and other functions can be provided by a unified communication (UC) platform that integrates these telecommunication functions into a server architecture and distributed telecommunication client applications. Such telecommunication client applications may be referred to as telecommunication clients, communication clients, UC clients, or clients. Such clients can be used to connect multiple users in virtual conferences, which may use audio, video, chat, screen sharing, or any of many other modalities. A client in these examples may be a software program running on a personal computing device, including a laptop, desktop, tablet, or mobile device. A client may also be an "appliance" such as a dedicated virtual conferencing device, such as a "video conference bar" or "video/sound bar" connected to a network and used in a physical conference room.

A UC platform also includes one or more user identity functionalities to authenticate user identities for users of the client devices. User identity services may be provided by an entity that is different than the entity managing the UC platform. User identity services authenticate user identities of one or more users to the UC platform provider in order to secure the information exchanged in a virtual conference. To provide for even more secure conferencing, a UC platform can enable every client device running a user client application to generate and manage its own long-lived public/private key pair. The private key is known only to the user client device. When these keys are used for end-to-end encryption, each device's key is used for virtual meeting information streaming from that client device to the other devices, providing per client device, end-to-end encryption so that different portions of the meeting data streams are encrypted with different client-generated, persistent keys. Other encryption, such as with a meeting key, can be imposed on top of these encrypted streams if desired. One or more servers at the UC platform provider can receive and store the client-generated, persistent keys from the user client devices along with the device identifiers (device IDs) as part of a device provisioning process or during the set-up process for a virtual meeting.

In order for an operator or provider of a UC platform to troubleshoot communication errors and performance problems, a tracing function may be used to produce logs of communication activity, account access, account set up, meeting setup, etc. The tracing function produces and stores detailed logs of the activity, which can be accessed by support and engineering personnel to provide technical support in the form of correcting networking or other errors to eliminate problems or improve performance. Despite the security mechanisms described above, some logs as initially captured may include the personal information of users as well as sensitive information of enterprise customers of the operator of the UC platform.

To provide greater security for users of modern digital communication platforms and applications, a UC platform according to this disclosure includes a technique to classify personal or other sensitive information in activity logs at the code level, that is, for individual expressions and values in the lines of an activity log. The technique can be used to separate activity logs into low sensitivity logs and high sensitivity logs, and to process an activity log using encryption and deletion to create low sensitivity and high sensitivity logs, which may also be referred to herein as logs or activity logs. The two kinds of logs can be maintained, each with different visibility to engineering and technical support personnel. The differing levels of visibility are facilitated using role-based access control for the log files.

Log file entries are initially received from a source, such as a server that provides logging services. Individual code expressions within each activity log are tagged and classified using a log anonymization interface generated by an activity log specific software development kit (SDK). The log specific SDK may also be platform specific. For example, one SDK may be used for system level activity logs and another SDK may be used for a client device interaction log. Log files can be written with designated names, for example: xxxx private.log (with sensitive information tagged and encrypted), and xxxx_clear.log (a log with no sensitive information). Log file content can then be sent through an asynchronous message queue in a middleware layer to be eventually stored in a database that provides search services using an analytics engine combined with a scalable data store.

A log query platform with differing user groups of support personnel is provided, where each user group provides authorization credentials that identify a role for role-based access control. Thus, users with appropriate roles can access the private (high sensitivity) logs, but other uses can only access the clear (low sensitivity) logs. The private logs may be needed to troubleshoot errors connected with, as examples, user account identification or encryption. Thus, engineers with relatively significant roles can access the private logs, while entry level support personnel may only be able to access the clear logs. Access can also be controlled based on geographic areas.

A system, according to some examples, accesses an activity log for a telecommunication system and detects, at the code level, sensitive information occurrences within the activity log. The system can anonymize the activity log by encrypting the sensitive information occurrences. The method further includes generating a private version of the activity log including the sensitive information occurrences as encrypted, and storing the private version of the activity log. The system stores the private version of the activity log in a log query database, or otherwise in some manner so that the system can receive log queries and display or print logs or portions of the logs needed to conduct troubleshooting.

In some examples, a system automatically also generates a clear version of the activity log with the sensitive information occurrences removed. This version of the log can be stored as well. A user can be given access to whichever version is appropriate based on the user's roll. In the case of the private log, the sensitive information occurrences can be revealed when the log is displayed to an authorized user or can be revealed when the user resubmits access credentials. The clear log can be subject to fewer access restrictions, since the sensitive information occurrences have been deleted.

A system may be configured to locate sensitive information occurrences in a log file in different ways. One way is through manual tagging carried out by developers or other responsible personnel prior to a log being released to a tracing system where logs are stored for troubleshooting. In other examples, the developers can tag occurrences at the beginning of the log and the system can automatically tag additional sensitive information occurrences throughout the log file based on the initial tags. In either case the input can be enabled by a software development kit (SDK) that provides an application program interface (API) for this purpose. A machine-learning model can also be trained and used to find sensitive information occurrences. The latter two techniques can also be used to enable a tracing system to verify the anonymization or removal of sensitive information occurrences from the logs.

The techniques disclosed herein for providing anonymization for log file access control enable improved information security for activity log files, which might otherwise be overlooked as a source of inadvertent exposure to sensitive information. By using anonymization for log file access control, sensitive information protection can be achieved while allowing troubleshooting and customer support activities to take place.

This illustrative example is given to introduce the reader to the general subject matter discussed herein and the disclosure is not limited to this example. The following sections describe various additional non-limiting examples and examples of systems and methods for providing anonymization for log file access control.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
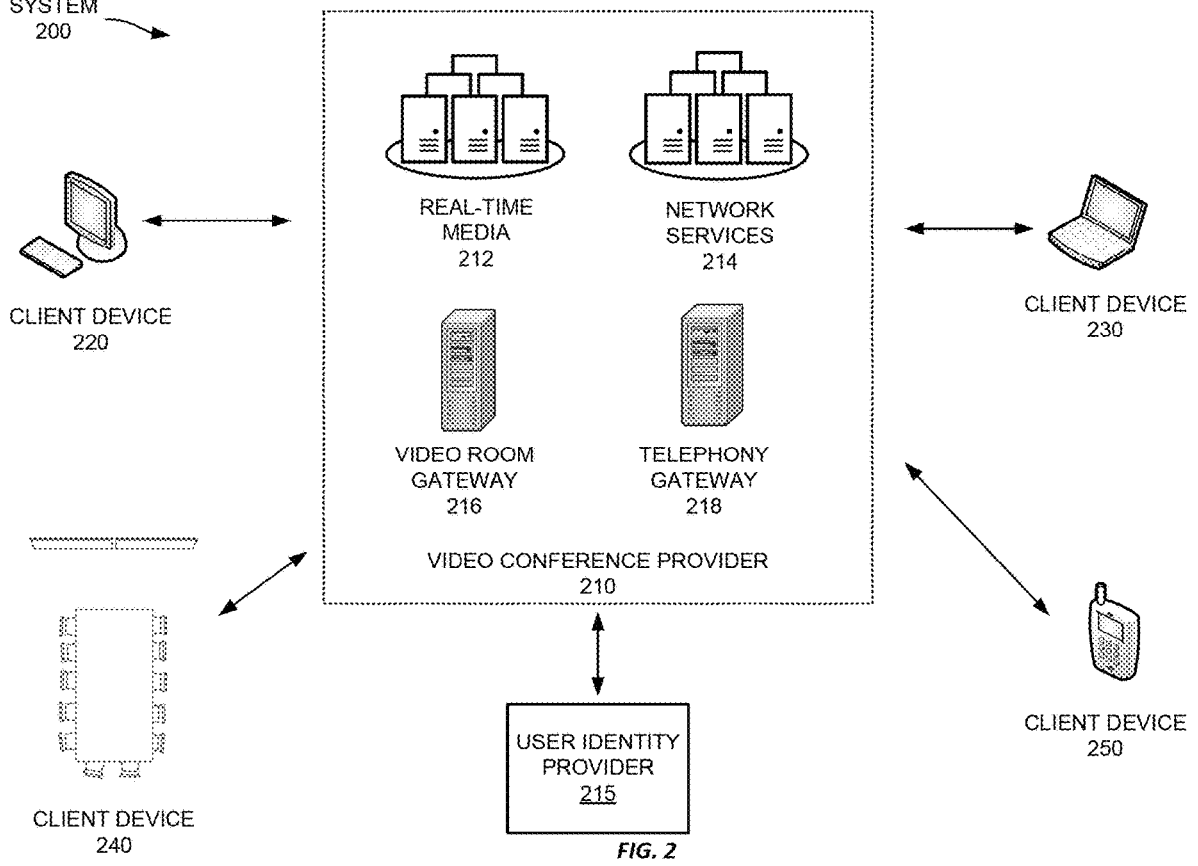

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text-based messaging during the meetings, create and manage breakout rooms from the main meeting, etc. FIG. 2, described below, provides a more detailed. description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as networks 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text-based chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateway servers 216, and one or more telephony gateway servers 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference provider 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the system of video conference provider 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting. the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones, and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Referring now to FIG. 3, FIG. 3 shows an example system 300, providing anonymization for log file access control. System 300 may implement a UC platform as previously discussed. In FIG. 3, videoconferencing functionality and chat functionality is provided to various client devices, such as client device 340 and client device 350, each communicatively coupled to network 320. System 300 includes meeting server 313. Meeting server 313 may also be referred to as a multimedia router and can be implemented by the real-time media servers 212 working with the network services servers 214. The meeting server maintains stored representations of virtual meetings taking place in the system 300 so that the meeting server 313 can keep track of the status of meetings without constantly exchanging this information with client devices such as client device 340 and client device 350.

System 300 of FIG. 3 includes session border controllers (SBCs) 315*a-b* for providing digital telephony services. System 300 includes two SBCs as an example. Any number of SBCs can be used; multiple SBCs provide redundancy. The SBCs provide call CODECs, audio processing, error correction, links to telephone carriers, and encryption for digital telephone calls between client applications to provide digital phone services. The SBCs secure client and carrier communications passing through a data center. The SBCs include load balancers and call switches. As an example, signaling for call setup, management, and teardown in system 300 can be accomplished using session initiation protocol (SIP). SIP communication through the call switches is evenly distributed by the load balancers based on call volume. The call switches provide call control for digital telephone communications. The call switches also provide integrated functions to enable calls to be transitioned to videoconferences using meeting server 313 and/or vice versa.

Still referring to FIG. 3, private branch exchange (PBX) server 360 provides audio and text telecommunication services to wired or cordless telephones within a building or campus. A PBX server may be provided on premises or may be located remotely, for example in a cloud computing system, to provide digital telephone services to an enterprise. A PBX server function may also be provided as a web service. In some examples, some of the PBX functionality may be provided by the SBCs and the PBX server may provide more limited functionality. PBX server 360 can send and receive text messages to and from a mobile carrier network in addition to handling call functions. As examples, PBX server 360 may be able to send and receive SMS text messages, multimedia message service (MMS) messages, and RCS text messages.

Continuing with FIG. 3, PBX server 360 as shown in FIG. 3 locates resources associated with a destination digital phone number in order to route calls and text messages. PBX server 360 may determine how to route messages and/or calls using elastic search. The PBX server may also make use of an asynchronous message queue to store and forward messages to and from the various client devices in system 300.

System 300 includes the log classification SDK 370, which provides an interface for controlling the anonymization and/or removal of sensitive information in log files. SDK 370 in examples herein resides in an internal server. In the example of FIG. 3, SDK 370 is part of the PBX server 360. It may also be part of the meeting server 313. SDK 370 provides for individual code-level expressions within each activity log to be tagged and classified using the SDK's log anonymization interface. Manual tagging carried out by developers or other responsible personnel prior to a log being released to a tracing system where logs are stored for future troubleshooting. In other examples, the developers can tag occurrences as they occur at the beginning of the log and the system can automatically tag additional sensitive information occurrences throughout the log file based on the initial manual tags. A machine-learning model either within SDK 370 or elsewhere can also be trained and used to find sensitive information occurrences.

Staying with FIG. 3, log query platform 380 in system 300 serves as a tracing system for accessing log files. Different user groups of support personnel can be provided, where each user group provides authorization credentials that identify a role for role-based access control. Thus, users with appropriate roles can access the private (high sensitivity) logs, but other uses can only access the clear (low sensitivity) logs. The private logs may be needed to troubleshoot errors connected with, as examples, user account identification or encryption. Role-based. access control can be provided using index binding customization, wherein an index of users is linked to database entries. Thus, engineers with relatively significant roles within the owner or provider of the UC services can access the private logs, while entry level support personnel may only be able to access the clear logs or the clear portions of the private logs. The same tracing function used to compile the logs initially can also provide periodical scans to automatically detect any sensitive information that has not been classified properly, and such errors can be reported and corrected.

Access can also be controlled based on geographic roles. Thus, the anonymization for log file access control as described herein may be used to protect information to the extent it is subject to export controls, preventing overseas support personal from inadvertently being given access to information protected by the laws of the country in which the log files are initially generated.

System 300, according to some examples, can anonymize the sensitive information occurrences, using key(s) to provide encryption. The occurrences of sensitive information within a log that has been anonymized by encryption can be revealed when a user with the proper role and/or credentials accesses the log query platform 380. The user may either be required to enter the access credentials again, or separate access credentials can be provided to un-mask the log file. It is also possible for the log query platform to un-mask the occurrences automatically for appropriate users at log in. The sensitive information occurrences in the clear version can be deleted or deleted and replaced with placeholder characters.

Figure 4:
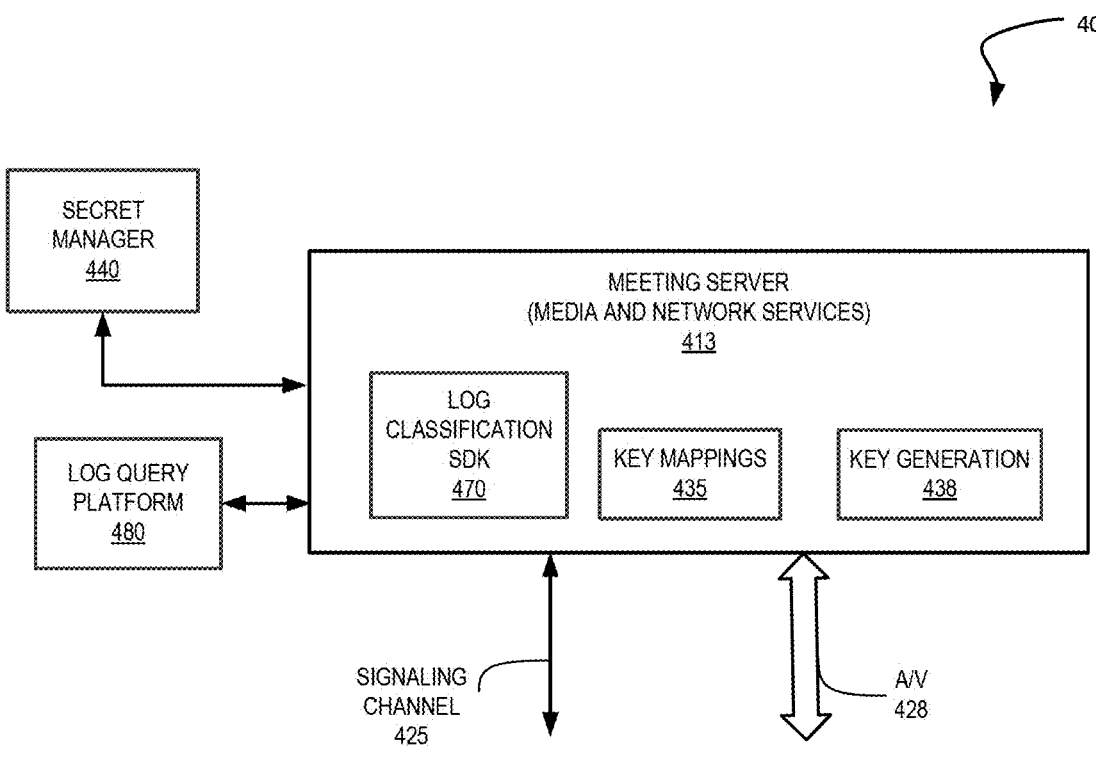
FIG. 4 illustrates an example of a system to provide encryption management for log file access control.

FIG. 4 illustrates an example of a system for encryption management for log file access control. System 400 includes a secret manager for end-to-end encryption of videoconferencing information. This secret manager can be accessed by systems such as system 300 to provide log data encryption and decryption. Example system 400 includes meeting server 413, which in this example includes the log classification SDK. Meeting server 413 may also be referred to as a multimedia router and can be implemented by the real-time media servers 212 working with the network services servers 214. The meeting server 413 maintains stored representations of the meetings and sub-meetings taking place in the system so that the meeting server can keep track of the status of meetings and sub-meetings. Some client devices also maintain stored representations of the meetings or sub-meetings to which an associated participant or host is subscribed so that virtual meeting rooms can be displayed to the users. A persistent key pair including an identity verifying key (IVK) and an identity signing key (ISK) can be generated for a client device. The meeting server can also generate such a key pair for each internal server application using log classification SDK 470 and log query platform 480, using key generation function 438, treating the log query system as a persistent meeting.

In system 400, meeting server 413 maintains key mappings 435. In some examples, key mappings 435 include one or more database tables which show bindings of IVKs with the SDK, and platform identifiers can be used to supply keys connected with user identifiers (user IDs) for users of the SDK and log query platform. Each persistent key pair includes the public IVK and a private ISK. Decryption takes place in log query platform 480 Client devices (not shown) are connected to meeting server 413 by a signaling channel 425 and by an audio/video (A/V) channel 428.

Staying with FIG. 4, meeting server 413 can provide encryption services for both virtual conferences (meetings) and activity log access. System 400 includes a secret manager 440 that generates cluster keys and manages the assignment of other keys corresponding to user credentials to use SDK 470 and log query platform 480. In this example, a cluster corresponds to a specific geographic area and the cluster keys are used to manage access for sensitive information from across international borders. This access management technique ensures compliance with information export control laws when activity logs are being reviewed or accessed by remote support personnel for troubleshooting purposes. However, cluster keys can also be used to separate users in the same region into groups for varying levels of access, either instead of, or in addition to the separation based on role-based access control.

Secret manager 440 in FIG. 4 can also manage ephemeral keys for individual login sessions for SDK 470 and log query platform 480. The ephemeral keys may be generated, as a design choice, by key generation 438 or by secret manager 440. In one example, the ephemeral key is created using an elliptic curve key generation as key pair. When a login session is created, the key generator or secret manager generates a new ephemeral key pair for the new session. The cluster key is used to calculate the ephemeral shared key along with the ephemeral private key. In this example, a cluster key is created by the secret manager using elliptic curve key generation. The public key can be accessed by users in any cluster, whereas the private key of each cluster is exclusive to the cluster. When the SDK or log query platform in this example applies for a cluster key from the secret manager, the secret manager checks the validity of the cluster key access and returns the keypair of the current cluster.

Referring now to FIG. 5, FIG. 5 illustrates an example software architecture to enable anonymization for log file access control. Users of the system providing log file anonymization and log file queries can log in via single sign-on SSO login point 502. Role-based access control function 504 includes defined roles for users, organized according to user credentials. For example, when a user logs in to log query platform 580, the user has a defined role, which determines the level of access to this system and other systems, such as logging subsystem 506, which includes the log-specific SDK. In order for the system to process activity logs for anonymization, server log messages are processed by logging subsystem 506. Middleware layer 508 treats the server(s) generating activity log entries as a producer of messages and the applications in system 500 as consumers of messages.

Continuing with FIG. 5, the elastic search database 510 stores the private and clear logs, which are accessed by the log query platform 580. Log query platform is a display and control console that accesses log files stored in elastic search database 510. Secret manager 513 can be implemented by the key functions of a meeting server, as previously discussed with respect to FIG. 4. In an example where the activity logs are being produced in a virtual meeting platform, the encryption function provided for virtual meetings can be reused for activity log file access and anonymization of sensitive information occurrences in activity logs as previously discussed. This reuse improves efficiency by eliminating the need for additional key generation and encryption functions to be deployed for system 500. However, separate key generation and/or encryption management functions can also be used.

SQL database 516 in FIG. 5 is provided to store ancillary operational and organizational information used by the various software entities of system 500. The various software entities in system 500 communicate with each other through encrypted messages. In this example, some of this communication takes place view SSL, while other communication takes place view HTTPS, as indicated in FIG. 5.

FIG. 6 illustrates an example method 600 for providing anonymization for log file access control. The description of the method 600 in FIG. 6 will be made with reference to the system of FIG. 3, the system of FIG. 4, and the software architecture of FIG. 5. However, any suitable system according to this disclosure may be used, such as the example systems 100 and 200 shown in FIGS. 1 and 2.

At block 602 of FIG. 6, a processor or processors (for example processor 910 in FIG. 9, discussed below) accesses an activity log using elastic search database 510. In this example, the activity log is one for a telecommunication system such as UC platform system 300. At block 604, the processor determines one or more tags for association with sensitive information occurrences within the activity log. At block 606, the processor anonymizes the activity log by encrypting sensitive information occurrences using an ephemeral key, and the one or more tags. The ephemeral key may be provided by secret manager 513.

For example, a developer or another user may use a console to tag occurrences, or to tag some occurrences, with the processor automatically tagging other identical or similar occurrences, which can then be anonymized by encryption for the private version of the log and by removal for the clear version of the log. The software architecture may also programmatically detect instances of sensitive information. In some examples of the present disclosure, implementations may include or otherwise use one or more artificial intelligence or machine-learning (collectively, AI/ML) systems having one or more models trained for one or more purposes. Use of such AI/ML systems, such as for certain features or functions, may be turned off by default, where a user, an organization, or both have to opt-in to utilize the features or functions that include or otherwise use an AI/ML system. User or organization consent to use the AI/ML systems or features may be provided in one or more ways, for example, as explicit permission granted by a user prior to the use of an AI/ML feature, as administrative consent configured using administrator settings, or both. Users for whom such consent is obtained can be notified that they will be interacting with one or more AI/ML systems or features, for example, by an electronic message (e.g., delivered via a chat or email service or presented within a client application or webpage) or by an on-screen prompt, which can be applied on a per-interaction basis. Those users can also be provided with an easy way to withdraw their user consent, for example, using a form or like element provided within a client application, webpage, or on-screen prompt to allow the user to opt-out of use of the AI/ML systems or features.

To enhance privacy and safety, as well as provide other benefits, the AI/ML processing system may be prevented from using personal information (e.g., customer audio, video, chat, screen-sharing, attachments, or other communications-like customer content (such as poll results, whiteboards, or reactions)) to train any AI/ML models and instead only use the personal information for inferencing of the AI/ML processing system. Instead of using personal information to train AI/ML models, AI/ML model training may be performed using one or more commercially licensed data sets that do not contain the personal information of the user or organization.

Continuing with FIG. 6, at block 608, the processor generates a private activity log including the sensitive information occurrences as encrypted. For encryption, the SDK can request public keys of clusters from secret manager 440 and generate an ephemeral key pair. The processor can use the ephemeral private key and corresponding cluster public key to provide ephemeral shared key encryption. The encryption module can parse the original log data to determine the data type, then based on the data type, a determination can be made as to which data items constitute sensitive data occurrences that need to be encrypted with the ephemeral shared key.

Staying with FIG. 6, at block 610, the processor generates a clear activity log with the sensitive information occurrences removed. For example, these occurrences may be removed and replaced with blanks or placeholder characters. At block 612, the processor stores the private version and the clear version of the activity log in the log query database.

Data encryption can use a Galois/counter mode (GCM) encode. A GCM encode needs two parameters: key and index value (IV), to provide an ephemeral shared key. The same key may require the IV to be unique for every GCM encode. The processor can use a line number up counter combined with the data index to provide the IV, and the IV can be attached to the encrypted data. GCM encoding provides symmetric encryption. Thus, the consumer of the encryption values needs the same ephemeral shared key to decrypt data. In order to make the management of the ephemeral shared key more efficient, the ephemeral public key can be written into the activity log along with encryption data.

FIG. 7 illustrates an example method 700 for providing access to activity logs that have been anonymized for log file access control. The description of the method 700 in FIG. 7 will be made with reference to the system of FIG. 3, the system of FIG. 4, and the software architecture of FIG. 5. Any suitable system according to this disclosure may be used, such as the example systems 100 and 200 shown in FIGS. 1 and 2.

At block 702 of FIG. 7, a processor or processors (for example processor 910 in FIG. 9, discussed below) receives an access request for the private version of an activity log. The access request may be received through log query platform 580, and the activity log may have been generated by a system such as UC platform system 300. At block 704, the processor receives a cluster key corresponding to a geographic area and an ephemeral key corresponding to the access request. Both of these keys can be generated by key management function 513. At block 706, the processor determines a role associated with the access request. The role may be determined by role-based access control function 504.

Staying with FIG. 7, at block 708, the processor grants access to the private version of the activity log based on the role, the cluster key, and the ephemeral key. The previously discussed GCM encoding provides symmetric encryption. The consumer of the encryption values, in this case the log query platform, needs the ephemeral shared key to decrypt data in the private versions of activity logs for properly qualified and authenticated users.

In order to decrypt sensitive information occurrences for access by authorized users, the ephemeral public key and the cluster public key, as well as the index of encrypted data need to be retrieved. A cluster key pair can be rotated following a selected time interval, and the current cluster key pair will be needed to access the private version of an activity log. If the current cluster key is not the cluster key last used, the secret manger 440 can be engaged to generate an updated cluster key pair. The processor can then provide the current cluster private key and the ephemeral public key to engage the secret manager 440 to generate an ephemeral shared key. The decryption function for the log query platform uses the ephemeral shared key to decode each encrypted data occurrence.

Continuing with FIG. 7, block 710 in method 700, the processor decrypts the sensitive information occurrence(s) in the private version of the log in response to the access request. The occurrences may be decrypted automatically with properly authenticated access based on role and the appropriate keys being available for the user. Alternatively, additional authentication to reveal sensitive information occurrences in response to the access request may be required, either to reveal all occurrences in the private version of the log, or for individual occurrences, groups of occurrences, etc. At block 712, the private version of the activity log is displayed with one or more sensitive information occurrences visible.

FIG. 8 illustrates an example log query platform 800 providing both high sensitivity and low sensitivity anonymized logs, as well as role-based access control for log file access. Source services 802 include the functions that compile the activity logs on an ongoing basis within the telecommunication system of interest, for example, services provided by servers in a UC platform such as system 300 in FIG. 3. Activity log data is transmitted by source services 802 to middleware (MW) layer 804. MW layer 804 provides buffering using a store and forward function to assemble the two versions of the activity logs. Encryption as well as removal of sensitive information occurrences are provided as previously discussed, and the two versions of the logs are sent to storage using storage links 806, resulting in private versions 808 of the logs and clear versions 810 of the logs being stored. These versions of the activity logs can then be accessed through the log query console 812, which runs on a computing device, displays logs, and receives input from users. Access to the appropriate versions of the log can be controlled by role-based access control function 814.

Figure 9:
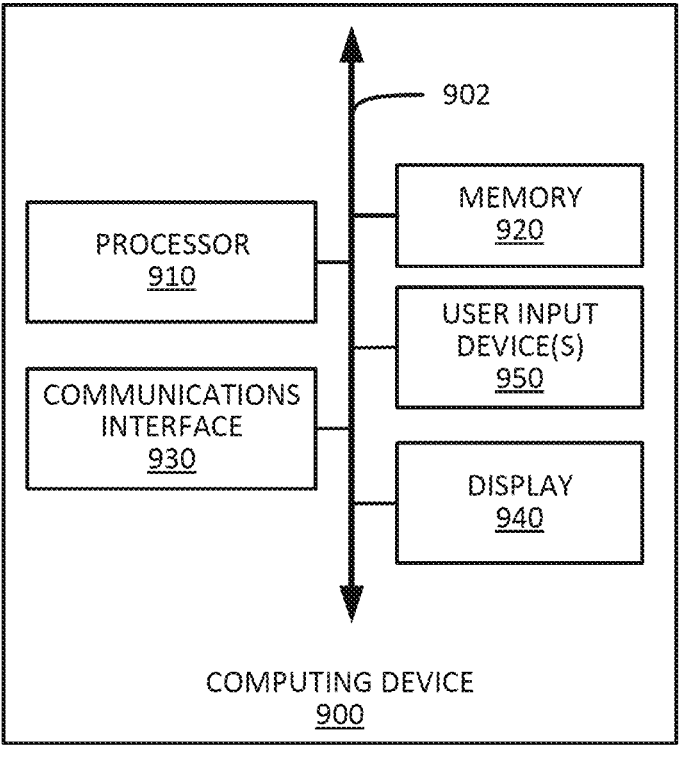
FIG. 9 shows an example computing device suitable for use with any disclosed systems, user interfaces, or methods according to this disclosure.

Referring now to FIG. 9, FIG. 9 shows an example computing device 900 suitable for use in example systems or methods for to provide anonymization for log file access control. The example computing device 900 includes a processor 910, which is in communication with the memory 920 and other components of the computing device 900 using one or more communications buses 902. The processor 910 is configured to execute processor-executable instructions stored in the memory 920 to perform one or more methods for providing anonymization for log file access control. The computing device, in this example, also includes one or more user input devices 950, such as a keyboard, mouse, touchscreen, video input device (e.g., one or more cameras), microphone, etc., to accept user input, for example user input directed to obtaining and using external services in an integrated fashion. The computing device 900 also includes a display 940 to provide visual output to a user, for example, a display of private or clear versions of activity logs as discussed above.

The computing device 900 also includes a communications interface 930. In some examples, the communications interface 930 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

As used below, any reference to a series of examples is to be understood as a reference to each of those examples disjunctively (e.g., "Examples 1-4" is to be understood as "Examples 1, 2, 3, or 4").

Example 1. A method includes accessing an activity log for a telecommunication system, detecting sensitive information occurrences within the activity log, and anonymizing the activity log by encrypting the sensitive information occurrences. The method further includes generating a private version of the activity log including the sensitive information occurrences as encrypted, and storing the private version of the activity log in a database configured to receive log queries.

Example 2. The method of example 1, further including generating a clear version of the activity log with the sensitive information occurrences removed, and storing the clear version of the activity log configured to receive the log queries.

Example 3. The method of example(s) 1-2, further including receiving an access request for the private version of the activity log. The method also includes determining a role associated with the access request and granting access to the private version of the activity log based on the role.

Example 4. The method of example(s) 1-3, further including decrypting at least one of the sensitive information occurrences in response to input corresponding the access request.

Example 5. The method of example(s) 1-4, further including receiving a cluster key, wherein the cluster key corresponds to a geographic area. The method also includes receiving an ephemeral key corresponding to the access request. The method further includes securing the access to the private version of the activity log using the cluster key and the ephemeral key.

Example 6. The method of example(s) 1-5, further including detecting a tag associated with a sensitive information occurrence from among the sensitive information occurrences and automatically tagging at least one additional sensitive information occurrence from among the sensitive information occurrences based on the tag.

7. The method of example(s) 1-6, further including using an ephemeral key generated by a meeting server to encrypt the sensitive information occurrences.

Example 8. A system including a processor and at least one memory device including instructions that are executable by the processor to cause the processor to execute the method of examples 1-7.

Example 9. A non-transitory computer-readable medium including code that is executable by a processor for causing the processor to carry out the method of examples 1-7.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, memory device, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The invention claimed is:

1. A method comprising:
accessing an activity log for a telecommunication system;
detecting sensitive information occurrences within the activity log;
encrypting the sensitive information occurrences;
generating a private version of the activity log including the sensitive information occurrences as encrypted;
storing the private version of the activity log in a database configured to receive log queries;
receiving a cluster key, the cluster key corresponding to a geographic area;
receiving an ephemeral key corresponding to an access request; and
securing access to the private version of the activity log using the cluster key and the ephemeral key.

2. The method of claim 1, further comprising:

generating a clear version of the activity log with the sensitive information occurrences removed; and
storing the clear version of the activity log in the database configured to receive the log queries.

3. The method of claim 1, further comprising:
receiving the access request for the private version of the activity log;
determining a role associated with the access request; and
granting the access to the private version of the activity log based on the role.

4. The method of claim 3, further comprising decrypting at least one of the sensitive information occurrences in response to input associated with the access request.

5. The method of claim 1, further comprising:
detecting a tag associated with a sensitive information occurrence from among the sensitive information occurrences; and
automatically tagging at least one additional sensitive information occurrence from among the sensitive information occurrences based on the tag.

6. The method of claim 1, wherein the ephemeral key is generated by a meeting server.

7. A system comprising:
a processor; and
at least one memory device including instructions that are executable by the processor to cause the processor to:
access an activity log for a telecommunication system;
detect sensitive information occurrences within the activity log;
encrypt the sensitive information occurrences;
generate a private version of the activity log including the sensitive information occurrences as encrypted;
store the private version of the activity log in a database configured to receive log queries;
receive a cluster key, the cluster key corresponding to a geographic area;
receive an ephemeral key corresponding to an access request; and
secure the access to the private version of the activity log using the cluster key and the ephemeral key.

8. The system of claim 7, wherein the instructions are executable to cause the processor to:
generate a clear version of the activity log with the sensitive information occurrences removed; and
store the clear version of the activity log in the database configured to receive the log queries.

9. The system of claim 7, wherein the instructions are executable to cause the processor to:
receive the access request for the private version of the activity log;
determine a role associated with the access request; and
grant the access to the private version of the activity log based on the role.

10. The system of claim 9, wherein the instructions are executable to cause the processor to decrypt at least one of the sensitive information occurrences in response to input associated with the access request.

11. The system of claim 7, wherein the instructions are executable to cause the processor to:
detect a tag associated with a sensitive information occurrence from among the sensitive information occurrences; and
automatically tag at least one additional sensitive information occurrence from among the sensitive information occurrences based on the tag.

12. The system of claim 7, wherein the ephemeral key is generated by a meeting server.

13. A non-transitory computer-readable medium comprising code that is executable by a processor for causing the processor to:

access an activity log for a telecommunication system;

detect sensitive information occurrences within the activity log;

encrypt the sensitive information occurrences;

generate a private version of the activity log including the sensitive information occurrences as encrypted;

store the private version of the activity log in a database configured to receive log queries;

receive a cluster key, the cluster key corresponding to a geographic area;

receive an ephemeral key corresponding to an access request; and secure the access to the private version of the activity log using the cluster key and the ephemeral key.

14. The non-transitory computer-readable medium of claim 13, wherein the code is executable for causing the processor to:

generate a clear version of the activity log with the sensitive information occurrences removed; and store the clear version of the activity log in the database configured to receive the log queries.

15. The non-transitory computer-readable medium of claim 13, wherein the code is executable for causing the processor to:

receive the access request for the private version of the activity log;

determine a role associated with the access request;

grant the access to the private version of the activity log based on the role; and decrypt at least one of the sensitive information occurrences in response to input associated with the access request.

16. The non-transitory computer-readable medium of claim 13, wherein the code is executable for causing the processor to:

detect a tag associated with a sensitive information occurrence from among the sensitive information occurrences; and automatically tag at least one additional sensitive information occurrence from among the sensitive information occurrences based on the tag.

17. The non-transitory computer-readable medium of claim 13, wherein the ephemeral key is generated by a meeting server.

* * * * *